United States Patent
McClean et al.

(10) Patent No.: US 9,948,058 B2
(45) Date of Patent: Apr. 17, 2018

(54) METHOD AND APPARATUS FOR DETERMINING OPTICAL FIBRE CHARACTERISTICS

(71) Applicant: II-VI Incorporated, Saxonburg, PA (US)

(72) Inventors: Ian Peter McClean, Brixham (GB); Manish Sharma, Morgan Hill, CA (US)

(73) Assignee: II-VI INCORPORATED, Saxonburg, PA (US)

(*) Notice: Subject to any disclaimer, the term of this patent is extended or adjusted under 35 U.S.C. 154(b) by 0 days.

(21) Appl. No.: 15/424,303

(22) Filed: Feb. 3, 2017

(65) Prior Publication Data

US 2017/0163003 A1 Jun. 8, 2017

Related U.S. Application Data

(62) Division of application No. 14/409,112, filed as application No. PCT/GB2013/051741 on Jul. 1, 2013, now Pat. No. 9,601,900.

(30) Foreign Application Priority Data

Jun. 29, 2012 (GB) .................... 1211559.8

(51) Int. Cl.
*H01S 3/13* (2006.01)
*H01S 3/30* (2006.01)
(Continued)

(52) U.S. Cl.
CPC ........... *H01S 3/1305* (2013.01); *G01M 11/33* (2013.01); *G01M 11/338* (2013.01);
(Continued)

(58) Field of Classification Search
CPC ..... H01S 3/1305; H01S 3/302; H04B 10/079; H04B 10/0797
See application file for complete search history.

(56) References Cited

U.S. PATENT DOCUMENTS

| | | | |
|---|---|---|---|
| 6,222,654 B1 * | 4/2001 | Frigo | H04J 14/0201 398/83 |
| 6,433,921 B1 | 8/2002 | Wu et al. | |
| | | (Continued) | |

FOREIGN PATENT DOCUMENTS

| | | |
|---|---|---|
| EP | 1 248 389 A2 | 10/2002 |
| EP | 1 508 985 A1 | 2/2005 |

OTHER PUBLICATIONS

Patent Cooperation Treaty, International Search Report, International Patent Application No. PCT/GB2013/051741, dated Jan. 20, 2014, 2 Pages.
(Continued)

*Primary Examiner* — Eric L Bolda

(57) ABSTRACT

An optical amplifier assembly for determining a parameter of an optical fiber configured to amplify an optical signal being propagated therethrough, the assembly comprising: at least one amplifier pump light source assembly configured to transmit light at a plurality of wavelengths into the optical fiber; a receiver configured to receive light that has propagated through at least part of the optical fiber; and a processor configured to determine the parameter of the optical fiber based on the received light.

10 Claims, 14 Drawing Sheets

(51) Int. Cl.
*H04B 10/079* (2013.01)
*G01M 11/00* (2006.01)
*H01S 3/094* (2006.01)

(52) U.S. Cl.
CPC .. *H01S 3/094046* (2013.01); *H01S 3/094076* (2013.01); *H01S 3/302* (2013.01); *H04B 10/0797* (2013.01)

(56) References Cited

U.S. PATENT DOCUMENTS

| | | | |
|---|---|---|---|
| 6,433,922 B1 | 8/2002 | Ghera et al. | |
| 6,519,082 B2 | 2/2003 | Ghera et al. | |
| 6,574,234 B1* | 6/2003 | Myer | H04L 12/2832 370/438 |
| 6,850,360 B1 | 2/2005 | Chen et al. | |
| 2003/0071985 A1* | 4/2003 | Mori | G01M 11/332 356/73.1 |
| 2003/0137653 A1 | 7/2003 | Kawabata | |
| 2004/0061846 A1 | 4/2004 | Elbers et al. | |
| 2004/0184817 A1 | 9/2004 | Iwasaki et al. | |
| 2005/0270634 A1 | 12/2005 | Krummrich | |
| 2009/0190204 A1 | 7/2009 | Onaka et al. | |
| 2012/0106950 A1* | 5/2012 | Madrahalli | H04J 3/065 398/25 |
| 2014/0077971 A1 | 3/2014 | Archambault et al. | |

OTHER PUBLICATIONS

Intellectual Property Office of the United Kingdom, Patents Act 1977: Search Report Under Section 17(5), United Kingdom Patent Application No. GB1211559.8, dated Oct. 26, 2012, 6 Pages.

Office Action for U.S. Appl. No. 14/409,112, dated Aug. 26, 2016, 8 Pages.

Office Action for U.S. Appl. No. 14/409,112, dated Mar. 7, 2016, 8 Pages.

* cited by examiner

METHOD AND APPARATUS FOR DETERMINING OPTICAL FIBRE CHARACTERISTICS

RELATED APPLICATIONS

This application is a divisional of U.S. application Ser. No. 14/409,112, filed Dec. 18, 2014, which is the U.S. national phase of PCT/GB2013/051741 filed on Jul. 1, 2013 and claims foreign priority to United Kingdom application number GB1211559.8 filed on Jun. 29, 2012, all of which are hereby incorporated by reference in their entirety.

TECHNICAL FIELD

The invention relates to determining the characteristics of an optical fibre. In particular, the invention relates to determining characteristics of an optical fibre for use in a telecommunications system incorporating an optical amplifier, such as a Raman amplifier.

BACKGROUND

Distributed Raman amplifiers (DRA) in optical telecommunications networks use transmission fibres to provide optical gain to signal channels. The distributed nature of the amplifier hinders the control of the amplifier, including the gain and safety requirements. This is because the amplifier controller does not know the characteristics of the amplification medium (i.e. the transmission fibre) with which it is to operate. This is unlike a discrete amplifier, such as an Erbium (Er) Doped Fibre Amplifier (EDFA) or discrete Raman amplifier.

To improve the situation, it is valuable for the DRA to know certain parameters of the optical transmission fibre span with which it is to operate. The parameters may include fibre type, fibre loss, fibre length, fibre gain coefficient and chromatic dispersion (CD), which can be used either within an optical network controller or used to determine the fibre type in the span. This information is used to control the operating characteristics of the DRA, as well as the safety system.

U.S. Pat. No. 6,850,360 describes a Raman amplifier system with diagnostic capabilities. Backscattered Raman pump light is used in optical time domain reflectometry (OTDR). This is very valuable and will provide information on the span losses and Raman gain coefficient, but the technique disclosed in U.S. Pat. No. 6,850,360 does not measure other parameters of the optical fibre.

Several methods exist to measure fibre CD. One conventional method, known as phase shift, uses two modulated lasers specifically designed for CD measurement and operating at different wavelengths. Light from the lasers is propagated through the optical fibre and the phase difference in the received laser light provides a measure of the delay experienced by the light from each laser, which is used to determine the CD of the fibre. To get an accurate measurement of CD against wavelength one laser is fixed and the other laser is tuned across a defined wavelength range to get a wavelength dependence of phase delay and thus the CD of the fibre.

In order to determine the parameters of the optical fibre, it is necessary to have test equipment and/or trained personnel at each end of an optical fibre to be tested. Optical fibre spans may have lengths in excess of 100s of kilometers, which places a significant burden on resources when determining parameters of an optical fibre.

SUMMARY

According to the invention in a first aspect, there is provided an optical amplifier assembly for determining a parameter of an optical fibre configured to amplify an optical signal being propagated therethrough. At least one amplifier pump light source assembly is configured to transmit light at a plurality of wavelengths into the optical fibre. A receiver is configured to receive light that has propagated through at least part of the optical fibre. A processor is configured to determine the parameter of the optical fibre based on the received light.

Optionally, the parameter of the optical fibre comprises the chromatic dispersion of the optical fibre and/or the length of the optical fibre.

Optionally, the at least one amplifier pump light source assembly comprises a tunable amplifier pump light source configured to output light selectively at one of a first and second wavelength.

Optionally, the tunable amplifier pump light source is a tunable 14XX laser device.

Optionally, the at least one amplifier pump light source comprises a first amplifier pump light source configured to output light at a first wavelength and a second amplifier pump light source configured to output light at a second wavelength.

Optionally, the processor is further configured to determine the parameter based on predetermined loss and length values for the optical fibre.

Optionally, the processor is configured to determine the chromatic dispersion using one of a phase shift, a differential phase shift and a time of flight method.

Optionally, the receiver is configured to determine a gain of the optical amplifier assembly based on the determined parameter.

Optionally, the receiver is further configured to set the gain of the optical amplifier assembly.

Optionally, the receiver is located at the same end of the optical fibre as the at least one amplifier pump light source, and wherein, the received light comprises stimulated Raman scattering reflections.

Optionally, the processor is further configured to de-correlate a continuum of stimulated Raman scattering reflections.

Optionally, the at least one amplifier pump light source is configured to emit pulses of light, and wherein the processor is configured to conduct optical time domain reflectometry analysis on the reflected pulses to determine loss values for the optical fibre, and to determine the chromatic dispersion based on the received pulse data.

Optionally, the optical fibre lies between the at least one amplifier pump light source and the receiver.

According to the invention in a second aspect, there is provided an optical system comprising an optical amplifier assembly described above. A master node and a slave node are in optical communication via one or more optical fibres, and are each configured to transmit and receive optical signals according to a predetermined protocol. The master node comprises the at least one amplifier pump light source and the slave node comprises the receiver. The master node is configured to transmit a first optical signal to the slave node via at least one of the one or more optical fibres. The slave node is configured to receive the first optical signal and, dependent on the predetermined protocol, take one or more of the following steps: determine the parameter based on the received first optical signal and transmit a second optical signal to the master node via at least one of the one or more optical fibres, the optical signal comprising data corresponding to the determined parameter; and transmit a second optical signal to the master node via at least one of the one or more optical fibres, the optical signal comprising raw signal information. The master node is further configured to receive the second optical signal and, if the second optical signal comprises raw signal data, determine the parameter based on the raw signal data.

According to the invention in a third aspect, there is provided a method for determining a parameter of an optical fibre of an optical amplifier assembly. At least one amplifier pump light source transmits light into the optical fibre. A receiver receives light that has propagated through at least part of the optical fibre. The parameter of the optical fibre is determined based on the received light.

Optionally, an optical system comprises a master node and a slave node in optical communication via one or more optical fibres, and each configured to transmit and receive optical signals according to a predetermined protocol, and wherein the master node comprises the at least one amplifier pump light source and the slave node comprises the receiver. The method comprises: transmitting, by the master node, a first optical signal to the slave node via at least one of one or more the optical fibres; receiving the first optical signal at the slave node; dependent on the predetermined protocol, the slave node taking one or more of the following steps: determining the parameter based on the received first optical signal and transmitting a second optical signal to the master node via at least one of the one or more optical fibres, the optical signal comprising data corresponding to the determined parameter; and transmitting a second optical signal to the master node via at least one of the one or more optical fibres, the optical signal comprising raw signal information; and receiving the second optical signal at the master node and, if the second optical signal comprises raw signal data, determining the parameter based on the raw signal data.

Optionally, the parameter comprises the length of span of the one or more optical fibres, and the predetermined protocol instructs the slave node to transmit the second optical signal to the master node comprising raw signal information.

Optionally, the length is determined based on a total travel time of the first and second signals, which is a time from transmission of the first optical signal to receipt of the second optical signal by the master optical node, less a time by the slave optical node from receipt of the first optical signal to transmission of the second optical signal.

Optionally, the parameter comprises the chromatic dispersion of the one or more optical fibres, and wherein transmitting the first optical signal comprises transmitting a plurality of optical signals each at a different wavelength.

Optionally, the predetermined protocol instructs the slave node to transmit the second optical signal comprising raw signal information.

Optionally, the predetermined protocol instructs the slave node to determine the chromatic dispersion and transmit the second optical signal comprising data corresponding to the determined chromatic dispersion.

Optionally, the optical amplifier assembly further comprises a controller in electrical communication with the master node and the slave node.

Optionally, an initiate signal is transmitted by the controller to the master node and the slave node to begin the determination of the parameter.

Optionally, an initiate signal is transmitted by the controller to the master node, which, in turn, transmits an initiate signal to the slave node to begin the determination of the parameter.

Optionally, the method further comprises transmitting, by the controller, the predetermined protocol to the master node and slave node.

Optionally, the method further comprises transmitting, by the master node, the predetermined protocol to the slave node.

According to the invention in a fourth aspect, there is provided a computer readable medium comprising computer readable code configured, when read by a computer, to carry out the method described above.

According to the invention in a fifth aspect, there is provided a master node for use in an optical system for determining a parameter of one or more optical fibres for use in an optical amplifier assembly. The master node is configured to be in optical communication with a slave node via the one or more optical fibres and is configured to transmit and receive optical signals according to a predetermined protocol. The master node is configured to transmit a first optical signal intended for a slave node and to receive a second optical signal transmitted by a slave node. The master node is further configured, if the second optical signal comprises raw signal data, to determine the parameter based on the raw signal data.

According to the invention in a sixth aspect, there is provided a method for operating a master node for use in an optical system for determining a parameter of one or more optical fibres for use in an optical amplifier assembly, the master node configured to be in optical communication with a slave node via the one or more optical fibres and configured to transmit and receive optical signals according to a predetermined protocol. The method comprising: transmitting a first optical signal intended for a slave node; receiving a second optical signal transmitted by a slave node; and if the second optical signal comprises raw signal data, determining the parameter based on the raw signal data.

According to the invention in a seventh aspect, there is provided a computer readable medium comprising computer readable code configured, when read by a computer, to carry out the method described above.

According to the invention in an eighth aspect, there is provided a slave node for use in an optical system for determining a parameter of one or more optical fibres for use in an optical amplifier assembly. The slave node is configured to be in optical communication with a master node via the one or more optical fibres and is configured to transmit and receive optical signals according to a predetermined protocol. The slave node is configured to receive a first optical signal transmitted by a master node and, dependent on the predetermined protocol, take one or more of the following steps: determine the parameter based on the received first optical signal and transmit a second optical signal comprising data corresponding to the determined parameter to the master node; and transmit a second optical signal comprising raw signal information to the master node.

According to the invention in a ninth aspect, there is provided a method for operating a slave node for use in an optical system for determining a parameter of one or more optical fibres for use in an optical amplifier assembly, the slave node configured to be in optical communication with a master node via the one or more optical fibres and configured to transmit and receive optical signals according to a predetermined protocol. The method comprises: receiving a first optical signal transmitted by a master node and, dependent on the predetermined protocol, taking one or more of the following steps: determining the parameter based on the received first optical signal and transmitting a second optical signal comprising data corresponding to the determined parameter to the master node; and transmitting a second optical signal comprising raw signal information to the master node.

According to the invention in a tenth aspect, there is provided a computer readable medium comprising computer readable code configured, when read by a computer, to carry out the method described above.

BRIEF DESCRIPTION OF THE DRAWINGS

Exemplary embodiments of the invention will be disclosed with reference to the accompanying drawings, in which.

DESCRIPTION

Generally, the inventors have appreciated that CD and fibre length measurement may be undertaken using a pump light source of an optical amplifier and, as such, no additional light sources that have been designed specifically for that task are required. Therefore, an optical amplifier assembly may determine the chromatic dispersion and other parameters of an optical fibre using the equipment typically found in the amplifier. The optical amplifier assembly may also set the gain of the amplifier accordingly.

Pump light source assemblies in a Raman amplifier may comprise either multiple high power lasers, each at a fixed, separate wavelength, or tuneable high power lasers. These may be used to undertake an accurate CD measurement and fibre span length measurement for an optical fibre to be used in the amplifier. This measurement may be taken over full transmission span lengths, which could be up to 300 km or more. The inventors have further appreciated that a tunable 14XX laser may also be used for more accurate CD measurement of an optical fibre compared with fixed wavelength lasers. Using fixed wavelength lasers only provides information relating to the CD measurement at a few points on the CD curve corresponding to the fixed wavelengths of the lasers. Using a tuneable laser allows many more data points to be determined for CD against wavelength, resulting in a more accurate measurement.

Figure 1:
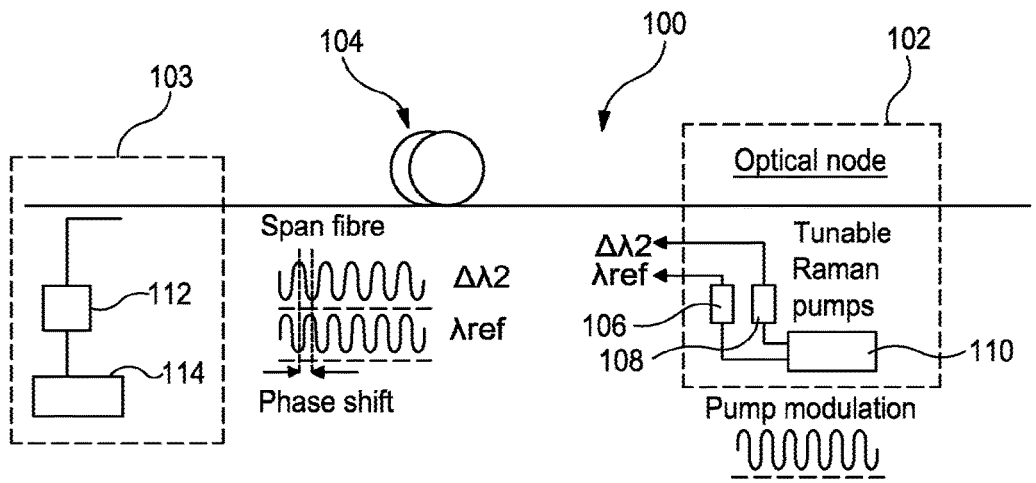
FIG. 1 is a schematic block diagram showing optical nodes connected to an optical fibre.

Referring to FIG. 1, a DRA assembly 100 is shown. The DRA assembly 100 comprises first and second optical nodes 102 and 103 and an optical fibre 104. The first optical node 102 comprises first and second tunable 14XX laser devices 106, 108 optically connected to the optical fibre 104 and configured to emit Raman pump light into the optical fibre 104. The first optical node 102 further comprises a processor 110, which is in electrical communication with the first and second tunable laser devices 106, 108. The second optical node 103 is located at the opposite end of the fibre 104 to the first optical node 102 and comprises a receiver 112 to detect the laser light emitted from the lasers 106, 108 used for the measurement and a processor 114 for processing the data received at the receiver 112.

The DRA assembly 100 may form part of an optical communications network comprising a plurality of optical nodes connected together by lengths of optical fibre.

An optical node may comprise a plurality of cards, which, in turn, comprise electrical and/or optical circuitry configured to undertake particular tasks within the optical node. In particular embodiments of the DRA assembly 100, the first and second tunable 14XX laser devices 106, 108 and the processor 110 may each be embodied in separate cards within an optical node 102.

The CD measurement may be undertaken using the tuneable 14XX lasers 106, 108. These can be used to perform accurate CD measurements using a phase shift method a differential phase shift method or a "time of flight" method.

In the phase shift method, a modulated signal is applied to the outputs of each of the tunable 14XX lasers 106, 108. In particular exemplary DRAs, a sine wave may be used as the modulating signal. The frequency of the modulation may be set to correspond with specifics of the measurement, such as the span length or measurement resolution. Modulated laser light is transmitted from the lasers 106, 108 into the optical fibre span 104. Because the tunable 14XX lasers 106, 108 are included in the DRA 100 as Raman pumps, they are already configured to transmit light into the optical fibre span 104. The inventors have appreciated that these Raman pumps may be used also to measure the CD of the optical fibre 104. The modulated light signals are received by receiver 116 and recorded in processor 114 (discussed below) after passing through the optical fibre 104. The phase difference between the two received modulated signals may then be measured by the processor 114. The wavelength of one of the tunable 14XX lasers 106, 108 is then altered and the process of measuring the phase difference is repeated whilst the other laser wavelength is fixed as a reference. The CD and dispersion slope is determined from the wavelength difference in phase delay.

In the differential phase shift method, the process is conducted as described above, but both tunable 14XX lasers 106, 108 are tuned together so that there is a fixed separation in wavelength.

In the time of flight method only one laser is used. Its output is pulsed and time taken for the pulse to reach receiver 116 at the other end of fibre 104 is recorded in processor 114. The wavelength of the laser is changed and a new pulse sent with the time to travel the fibre length recorded. A number of measurements at different wavelengths are taken providing a map of wavelength and relative delay which can lead to the determination of the fibre CD.

Figure 2:
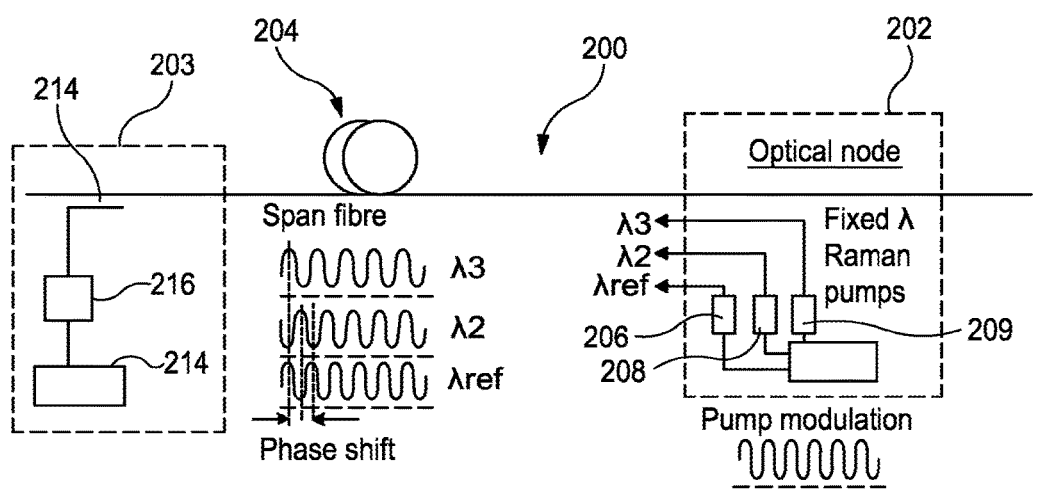
FIG. 2 is a schematic block diagram showing optical nodes connected to an optical fibre.

Phase shift and differential phase shift methods may also be implemented with a plurality of fixed wavelength Raman pump lasers, a configuration that is common in DRAs (or, alternatively, one of the tuneable lasers could be at a fixed wavelength). FIG. 2 shows a BRA 200 comprising an optical node 202 and 203 and an optical fibre 204. The optical node 202 comprises three Raman pumps 206, 208, 209 each configured to emit light at a fixed wavelength different to the wavelength of light emitted by the other Raman pumps. The optical node 203 comprises a receiver 212 that detects laser light emitted from the lasers 206, 208, 209 and a processor 214 for processing the data received at the receiver 212. The receiver 212 may include apparatus to discriminate the different lasers that are received. In the exemplary DRA 200 of FIG. 2, a first Raman pump 206 is configured to emit light at a first wavelength, $\lambda_{ref}$, a second Raman pump 208 is configured to emit light at a second wavelength, $\lambda_2$, and a third Raman pump 209 is configured to emit light at a third wavelength, $\lambda_3$. Each of the Raman pumps 206, 208, 209 is optically connected to the optical fibre 204 and light emitted from the pumps 206, 208, 209 is transmitted into the optical fibre 204.

The different wavelengths of light emitted by the Raman pump lasers 206, 208, 209 obtain good gain flatness from the DRA 200. The DRA 200 is therefore designed to include the Raman pump lasers 206, 208, 209 as part of its primary function, as a DRA. As an alternative to using the tuned 14XX lasers 106, 108 for the phase difference method, as in the exemplary DRA 100 of FIG. 1, the CD measurement can be carried out using the DRA 200 of FIG. 2. This may be done by designating the Raman pump laser 206 emitting the shortest wavelength light as a reference $\lambda_{ref}$ and recording the phase difference between the reference and the received light at the other wavelengths $\lambda_2$, $\lambda_3$, which has been propagated through the optical fibre 204. All wavelengths of light may be transmitted into the fibre at the same time if filters are used in the receiver path to discriminate between the different lasers being sent along the fibre.

Figure 3:
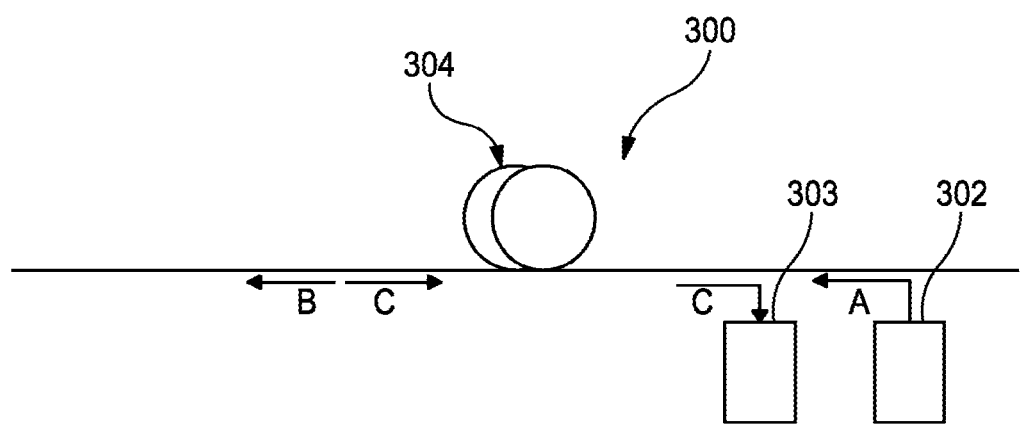
FIG. 3 is a schematic block diagram showing an apparatus for determining parameters of an optical fibre.

In an alternative DRA assembly, the receiver may be located at the same end of an optical fibre as the pump light source assembly. This arrangement is shown in FIG. 3, in which a DRA 300 comprises a pump light source assembly 302 and a receiver 303 optically connected to an optical fibre 304. The pump light source assembly 302 and the receiver 303 are each located at the same end of the optical fibre 304. In particular exemplary DRAs, the pump light source assembly 302 and the receiver 303 are located in the same optical node. The pump light source assembly 302 is configured to emit light into the optical fibre 304 in a direction indicated by arrow A. A portion of the light is propagated through the optical fibre 304, as shown by arrow B. However, a portion of the light is reflected back down the optical fibre 304 in the direction of arrow C, due to stimulated Raman scattering (SRS). The reflected light may be received at the receiver 303.

Figure 4:
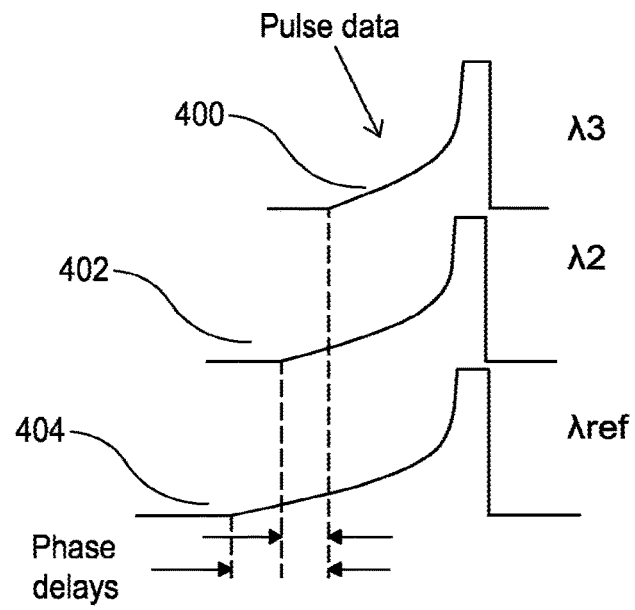
FIG. 4 shows timing diagrams of received signals.

As mentioned above, the received light will be predominantly from SRS reflections so a continuum of reflected signals will be received at the receiver 303. The continuum of reflected signals are de-correlated by the receiver 303, after which, they may be used to determine the CD of the optical fibre 304 using the methods described above. FIG. 4 shows a series of pulses that have been reflected by SRS in the fibre and detected at the receiver 303. The waveforms show the time for a pulse to return to the receiver is dependent upon the wavelength of light emitted from a laser, which can be used to determine the relative delay of each light wavelength. FIG. 4 shows light signals of a reference wavelength 400 a first wavelength 402 and a third wavelength 404. The reflected waveforms may be used to measure both OTDR and CD characteristics of the optical fibre 304 at the same time. The phase delays between the waveforms 400, 402, 404 give an indication of the phase delay of the fibre and are used to determine the CD, and the pulse edges are used for an OTDR measurement. Therefore it is possible to combine OTDR and CD measurements in a single test.

The DRA 300 of FIG. 3 may be used with the tunable 14XX lasers shown in FIG. 1 and the fixed wavelength Raman pumps of FIG. 2. Therefore, the amplifier pump light source assembly 302 may comprise either a tunable 14XX laser device or a plurality of fixed wavelength pump lasers.

The determination of the CD of an optical fibre using the reflected pulse method may be undertaken alongside an OTDR measurement using the same pulse data. This allows the same information to be used for OTDR calculation and the CD of the optical fibre 304 at the same time, reducing the need for a receiver at a second node in the system.

An advantage of the use of the DRA 300 of FIG. 3, in which a receiver 303 is located at the same end of the optical fibre 304 as a pump light source assembly 302 is that the measurements required to understand the fibre type, loss and gain coefficients that can be used to set the gain of the DRA 300 may all be undertaken at the same location, i.e. the same end of the fibre 304. Therefore, there is no need for additional equipment and/or personnel to be in position at the other end of the fibre 304.

Figure 5:
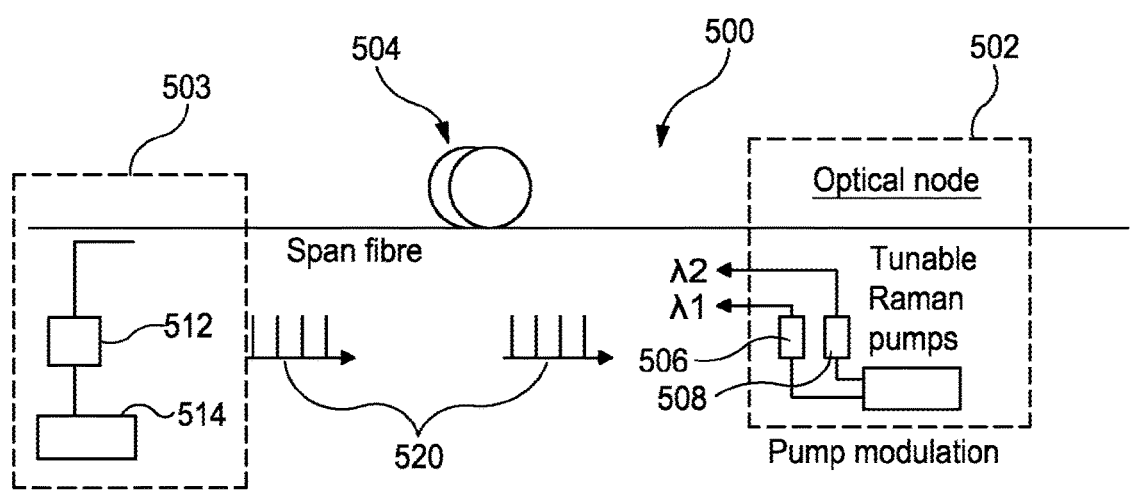
FIG. 5 is a schematic block diagram showing optical nodes connected to an optical fibre.

Measurement of optical fibre length can be carried out using a similar DRA assembly construction to that used for CD measurement. FIG. 5 illustrates a similar optical network structure as shown in FIG. 1. However, in the DRA assembly 500 of FIG. 5, only one of the Raman pump lasers 506, 508 is required and the transmitted signal is a series of pulses 520. The length of the optical fibre 504 is determined by a time of flight measurement that determines the length by the delay between sending a pulse 520 from a first optical node 502 using one of the lasers 506 or 508 and being detected in a receiver 512, which is located in a second optical node 503. A processor 514 is used to detect the received signal which in turn is used to determine the fibre span length.

FIG. 5 illustrates a single ended measurement and relies on careful timing of signals. However, it is also possible to undertake a dual ended signal measurement. In such cases, the second node 503 also comprises one or more lasers configured to transmit return pulses back to the first node 502. The return pulses are synchronised to the pulses transmitted from the first node 502 and a more accurate measurement can therefore be taken. The return pulses may be transmitted back along the same fibre, on a different fibre within the same cable (since fibre optic connections are usually duplex fibre connections, the other fibre of the duplex connection can be easily used for this purpose). In this case, Raman pump lasers 506 and 508 are the Raman pump lasers already included as part of the DRA 500. The one or more lasers transmitting the return pulses from the second optical node 503 may be optical amplifier lasers, such as those in a forward propagating Raman amplifier. Alternatively, they may be a pulsed EDFA output already included in the output section of node 503.

It is noted that, although the description above mentions the use of pulses to measure the time of flight, other encoding schemes, such as the use of CW modulation and phase detection on the receive end, can be used to measure the propagation delay.

In exemplary DRAs, the receiver may be configured to determine and/or set the gain of the amplifier based on the determined CD. This may be done in conjunction with the methods described below.

The inventors have further appreciated that, in DRAs in which a receiver is located at the opposite end of an optical fibre to the pump light source assembly, a communication flow of data between a pump light source assembly and the receiver may provide a means for determining parameters of the optical at the pump light source assembly. This removes the need to have skilled personnel located at the receiver end of the optical fibre. Defining the flow of information is particularly advantageous if the cards within an optical node are from different card suppliers.

To obtain the best performance of DRA it is valuable to know the optical fibre loss, the fibre length, the fibre CD and the fibre type. The fibre loss can be determined using a single card at one point in an optical fibre span. The method to calculate the length and CD of the fibre cannot be determined using one card at one point in the span, but may be determined using a card either side of the fibre span. In general, disclosed herein are methods and apparatuses to coordinate the two cards, generate data and pass data between the cards.

Figure 6:
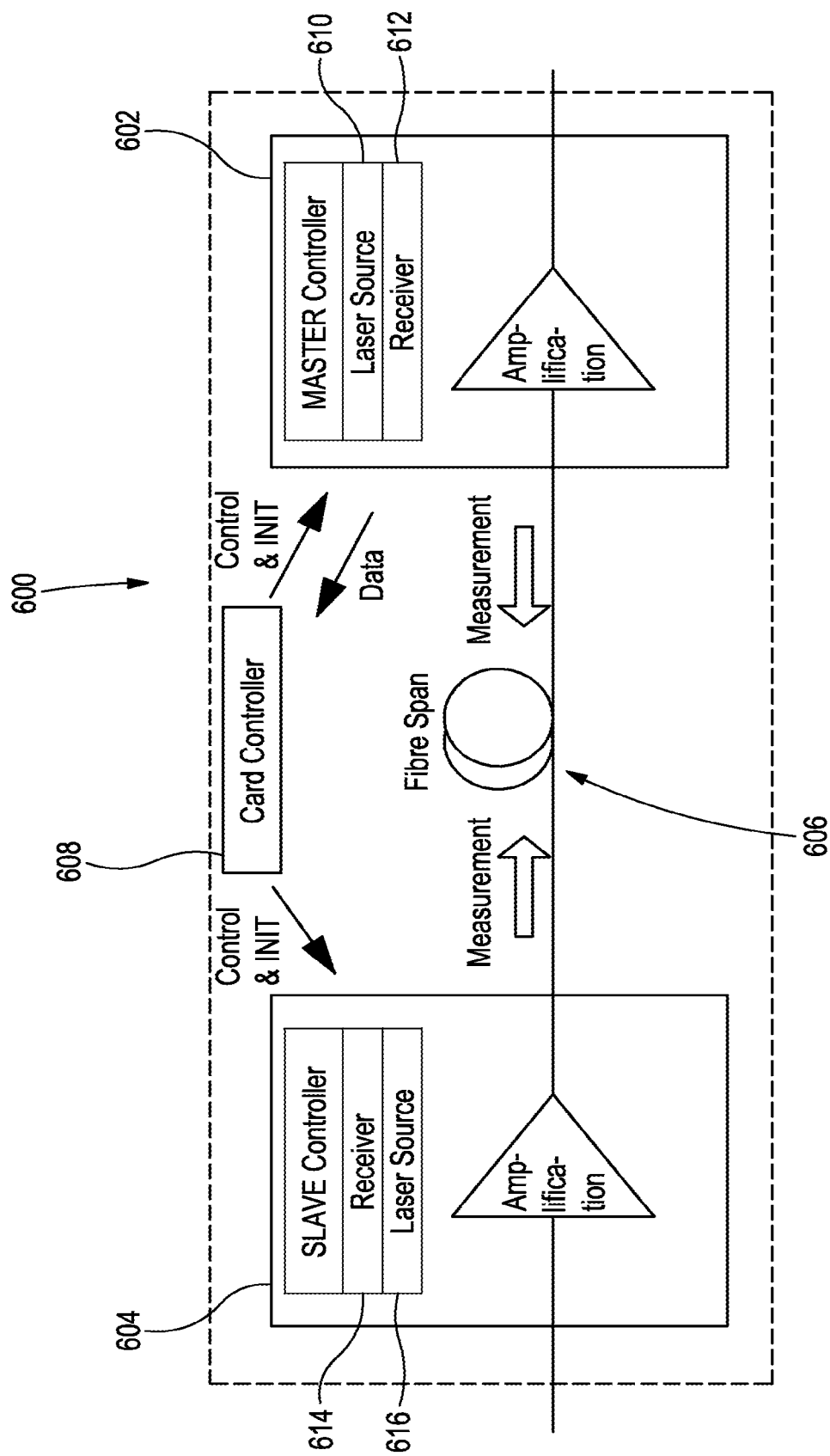
FIG. 6 is a schematic block diagram showing a master node and a slave node connected via an optical fibre.

FIG. 6 shows an optical amplifier assembly 600 comprising a master optical node 602 and a slave optical node 604 optically connected by an optical fibre 606. A card controller 608 is in electrical communication with each of the master optical node 602 and the slave optical node 604 for passing data there between. At each of the master optical node 602 and the slave optical node 604, optics and electronics are placed to perform the measurements required to determine one or more parameters of the optical fibre 606. Each node may comprise a discrete and/or distributed amplification capability, reconfigurable optical add-drop multiplexers, dispersion compensation equipment etc. In particular, within each of the master and slave optical nodes 602, 604 the optics and electronics to measure the length of the fibre span and CD of the optical fibre 606 are included.

The master optical node 602 is located at a downstream end of the span relative to the direction of propagation of an optical signal, and the slave optical node 604 is located at a upstream end. It is noted that the master and slave optical nodes 602, 604 may be placed at the other ends of the optical fibre, but herein they are described as in FIG. 6.

The master optical node 602 comprises a laser source 610 and a receiver 612. The laser source 610 and the receiver 612 are both for measurement purposes in the exemplary apparatus of FIG. 6. However, the laser source 610 may be an optical amplifier pump light source as described above. The master optical node 602 may be part of an existing optical card in the optical node, such as an amplifier, but may alternatively be part of a separate card.

The slave optical node 604 comprises a receiver 614 and laser source 616. The laser source 616 and the receiver 614 are each for measurement or communication purposes in the exemplary apparatus of FIG. 6. The laser source 616 may be an optical amplifier pump light source as described above or the output of a laser through an optical amplifier, such as an EDFA, placed at the egress of the node 604. The wavelengths emitted by the laser sources 610, 616 are chosen to allow detectable transmission of the laser sources 610, 616 from one end of the optical fibre span 606 to the other. Further, the wavelengths and are chosen for the particular application, fibre type etc. An example wavelength is 1550 nm, which may be advantageous due to low loss and easy availability for telecommunications transmission. However, 14XX pump lasers may also be used as inherent amplifier lasers.

In a first exemplary optical amplifier assembly, the card controller 608 controls the process of transferring data between the master and slave optical nodes 602, 604, which operate to a defined sequence.

Figure 7:
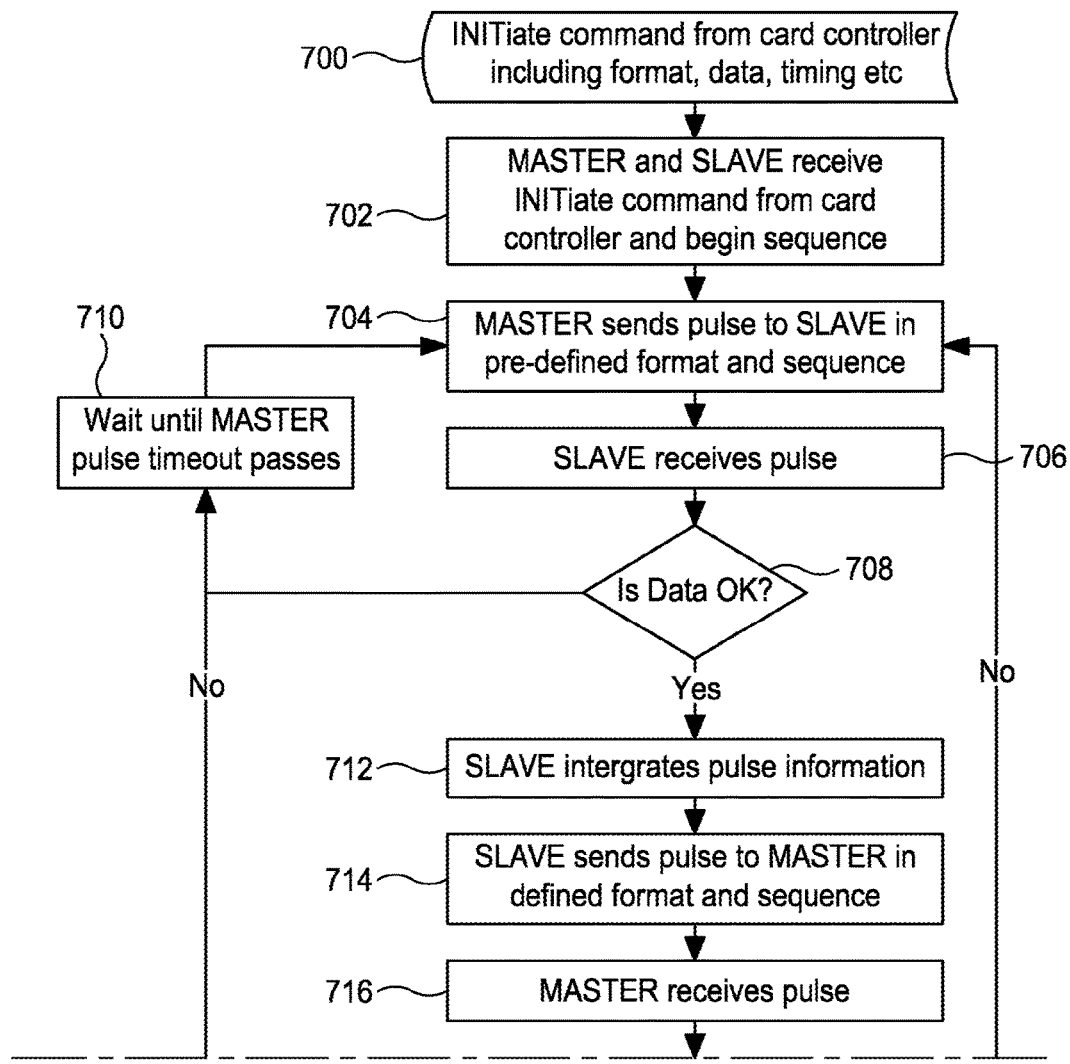
FIG. 7 is a method for determining parameters of an optical fibre.
Figure 7:
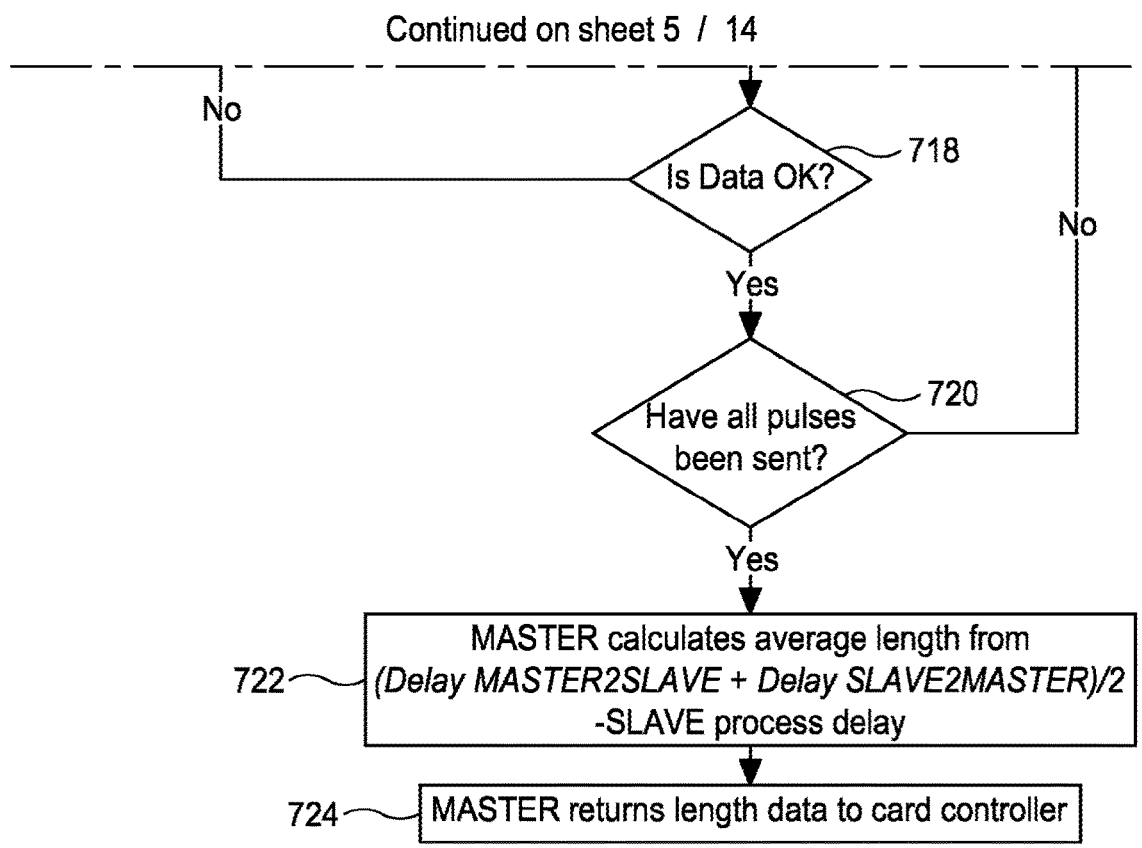

FIG. 7 shows a flow chart of a method of transferring data between the master optical node 602, the slave optical node 604 and the card controller 608 card to determine the length of the optical fibre 606. In the exemplary method of FIG. 7, the card controller 608 is configured to communicate with both the master optical node 602 and the slave optical node 604. The length of optical fibre 606 is calculated as an average time of flight for a pulse to be sent from the master optical node 602 to the slave optical node 604 and back again, incorporating processing time required at the slave optical node 604.

The optical power outputs of the laser sources 610, 616 are set to ensure receivers 612, 614 at either end can detect the transmitting light.

In general, a first laser pulse from the master optical node 602 laser source 610 is transmitted along the optical fibre 606 and is received at the slave optical node 604. Once the pulse is received, the slave optical node 604 transmits a second laser pulse back to the master optical node 602. The master optical node 602 receives the second laser pulse and calculates the fibre length from the time taken to send the first pulse and receive the second pulse, less any processing time taken by the slave optical node 604. The processing time may be a known fixed delay between receive and send or the time may be encoded on the pulse data sent back to node 602. The data must pass from the master optical node 602 to the slave optical node 604 and back again with adequate accuracy to produce a good measurement.

Referring to FIG. 7, an initiate and control command is transmitted 700 by the card controller 608 to the master and slave optical nodes 602, 604.

The initiate and control command is received 702 by the master and slave optical nodes 602, 604 and defines a predetermined protocol for the data flow of communications between them. Upon receiving the initiate and control command, the master and slave optical nodes 602, 604 store the predetermined protocol and refer to it for future optical communications.

The master optical node 602 transmits a first laser pulse to the slave optical node 604 in a predefined format and sequence, dictated by the predetermined protocol.

The slave optical node 604 receives 706 the first pulse and determines whether the data contained therein is free from errors 708.

If the data in the first pulse contains errors then the slave optical node 604 waits 710 until the master optical node 602 times out and retransmits the first pulse. If the data in the first pulse is determined to be free from errors, the slave optical node 604 integrates 712 the information in the first pulse and transmits 714 a second laser pulse to the master optical node 602 in a defined format and sequence, dictated by the predetermined protocol. The second laser pulse is considered to comprise raw signal information as it does not comprise data relating to a determined parameter. The important factor is the travel time through the optical fibre 606 as discussed below.

The master optical node 602 receives 716 the second laser pulse and determines 718 whether the data contained in the second pulse is free from errors. If the data in the second pulse comprises errors then the master optical node 604 waits 710 for time out and retransmits the first laser pulse to the slave optical node 604 to start the process again.

If the data in the second laser pulse is free from errors then and all the pulses have been sent 720, the master optical node 602 determines 722 the length of the optical fibre 606 from a total flight time of the first and second pulses, which is calculated by the time from transmission of the first pulse by the master optical node 602 to the time of receipt of the linked pulse from the slave optical node 604, minus the time from receipt of the first pulse to transmission of the second pulse by the slave optical node 604.

The master optical node 602 then returns 724 the length of the optical fibre 606 to the card controller 608.

Figure 8:
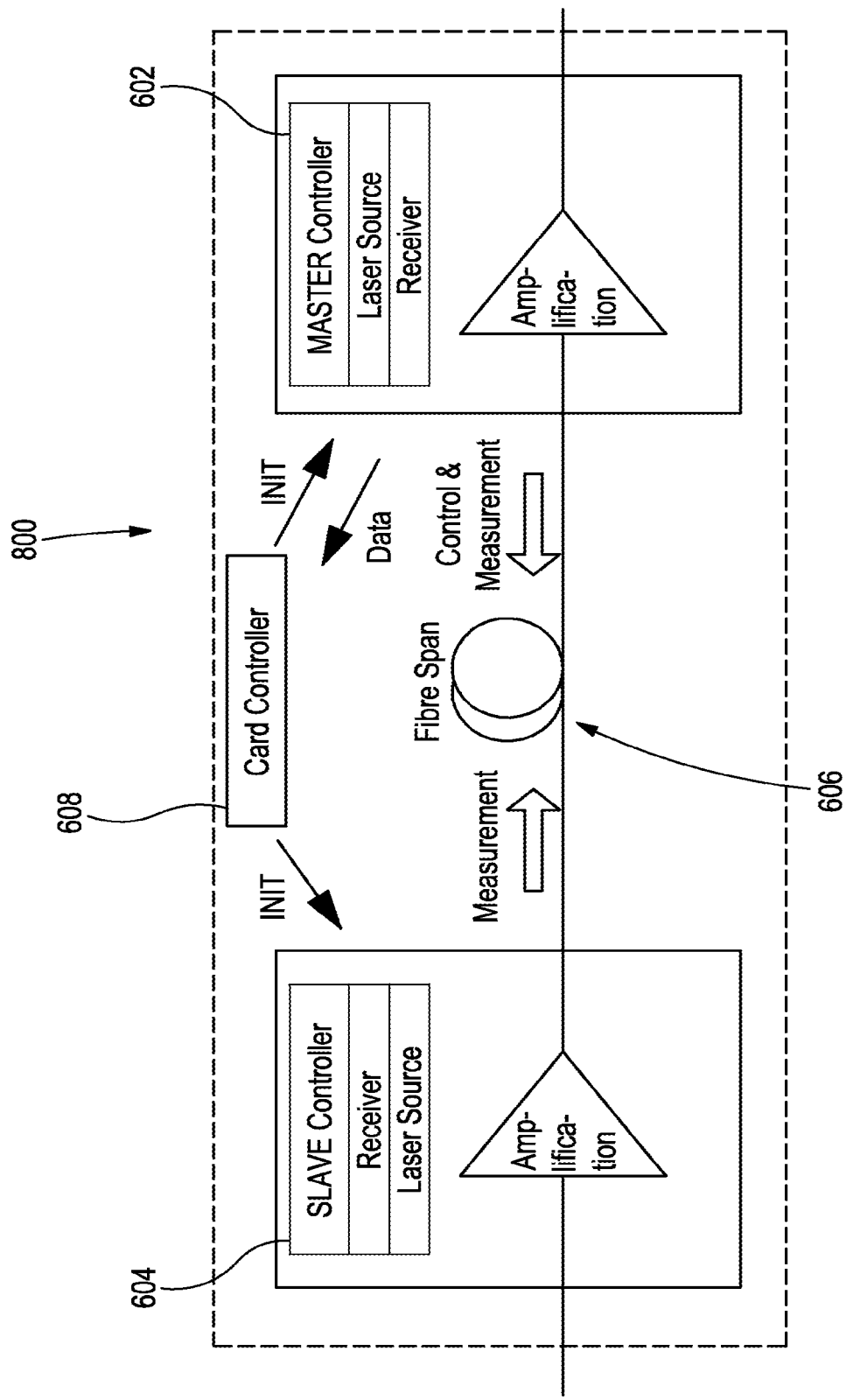
FIG. 8 is a schematic block diagram showing a master node and a slave node connected via an optical fibre.

FIG. 8 shows an optical amplifier assembly 800 configured for different operation. The topology of the assembly 800 may be the same as that of assembly 600 and features of the assembly 800 corresponding to those shown in FIG. 6 have the same reference numerals. In the assembly 800 of FIG. 8, the card controller 608 is configured to transmit only an initiate command to the master optical node 602 and the slave optical node 604. The command data is determined by the master optical node 602 and is transmitted from the master optical node 602 to the slave optical node 604 via the optical fibre 606. Therefore, the master optical node 602 may be considered the controller in the system as it determines the protocol by which it and the slave optical node 604 communicate with each other. An initiate command is still received from the card controller 608, but the master optical node 602 determines the sequence details.

Figure 9:
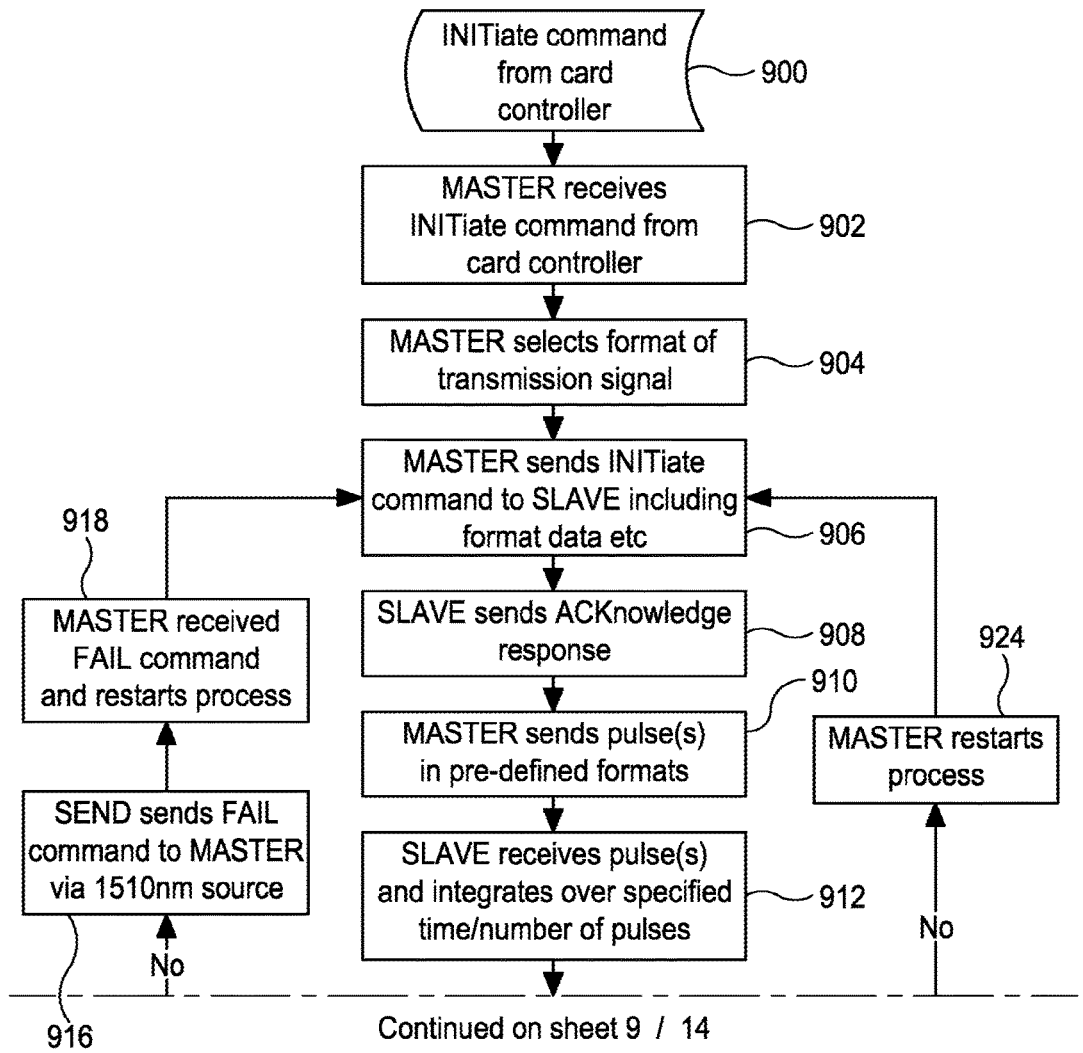
FIG. 9 is a method for determining parameters of an optical fibre.
Figure 9:
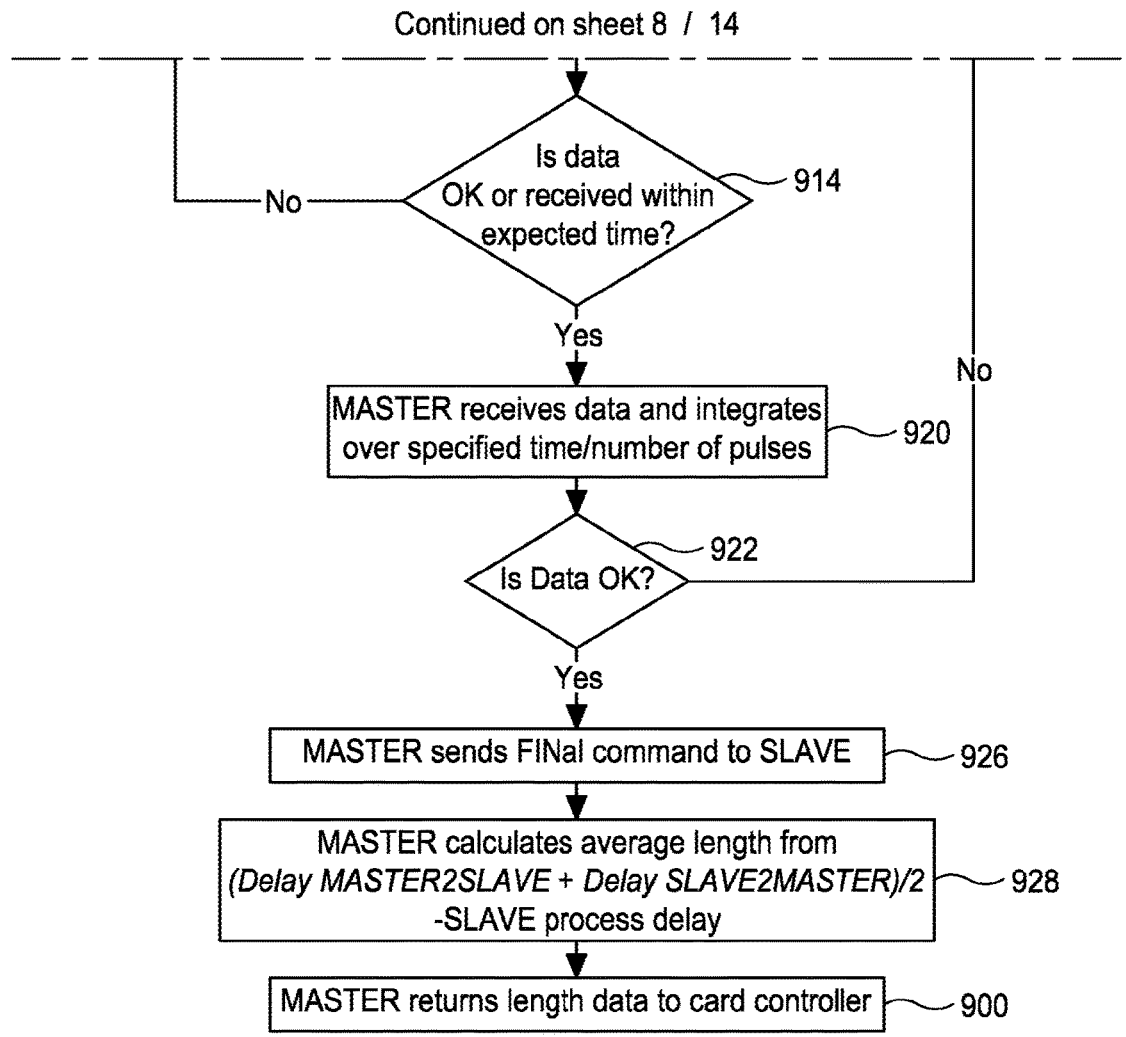

Referring to FIG. 9, a method of determining the length of the optical fibre 606 is shown using the configuration of the optical amplifier assembly 800.

An initiate command is transmitted 900 by the card controller 608 and is received 902 by the master and slave optical nodes 602, 604.

The master optical node 602 selects 904 the format of the optical signals to be transmitted to the slave optical node 604 over the optical fibre 606 and transmits 906 an initiate and control command to the slave optical node 604. The initiate and control command informs the slave optical node 604 that a length measurement is about to take place and what format the optical signals will be transmitted in. The format of the optical signals forms a predetermined protocol and is stored by the slave optical node 604 for reference during the length measurement. The slave optical node 604 transmits 908 an acknowledge response to the master optical node 602 to indicate that the initiate and control command has been received.

The master optical node 602 transmits 910 a first laser pulse in accordance with the predetermined protocol, which is received 912 at the slave optical node 604 and integrated over a specified time or averaged over a number of pulses. The time or number of pulses used will depend upon the noise in the system and a longer integration time or number of averaged pulses will reduce noise and provide a more accurate measurement.

The slave optical node 604 checks 914 the received first pulse for errors. If errors are present, the slave optical node 604 transmits 916 a fail command to the master optical node 602 via the optical fibre 606, which is received 918 by the master optical node 602 and the process is begun again.

If the data in the first pulse is error free, the slave optical node 604 transmits a second laser pulse to the master optical node 602, which receives 920 the second pulse and integrates the data over a specified time or number of pulses. The second laser pulse is considered to comprise raw signal information as it does not comprise data relating to a determined parameter. The important factor is the travel time through the optical fibre 606 as discussed below.

The master optical node 602 checks 922 whether the data in the second pulse comprises errors and, if so, restarts 924 the process.

If the data is free from errors, the master optical node 602 transmits 926 a final command to the slave optical node 604 to indicate that the process is complete, determines 928 the length of the optical fibre 606 and transmits 930 the determined length to the card controller 608.

Figure 10:
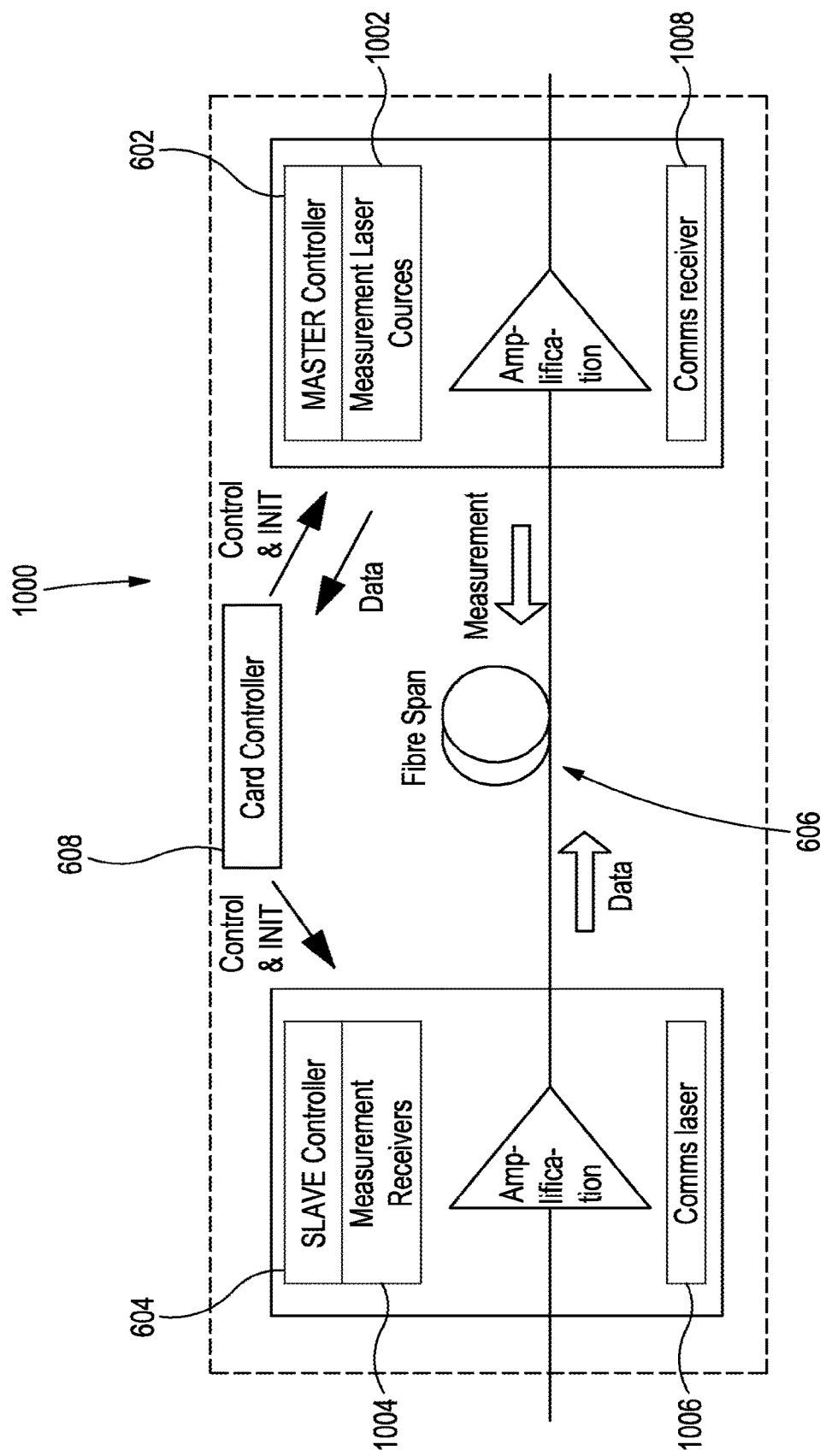
FIG. 10 is a schematic block diagram showing a master node and a slave node connected via an optical fibre.

Referring to FIG. 10, an optical amplifier assembly 1000 is shown. The topology of the assembly 1000 may be the same as that of assemblies 600, 800 shown in FIGS. 6 and 8. Corresponding features of the assembly 1000 have the same reference numeral. The optical amplifier assembly 1000 may be configured to determine the CD of the optical fibre 606. A difference between the assembly 1000 of FIG. 10 and the assemblies 800, 900 of FIGS. 8 and 9 is that laser transmission for the measurement is only required in one direction thus the master optical node 602 comprises the measurement laser sources 1002 and the slave optical node 604 comprises only receivers 1004. However, a communication path is required from the slave optical node 604 to the master optical node 602 which in this example uses a communication laser 1006 and receiver 1008. This may be at the same or wavelength or a different wavelength to the measurement lasers.

In the exemplary optical amplifier assembly 1000 of FIG. 10, the control of the process is performed by the card controller 608. The master and slave optical nodes 602, 604 operate to a defined sequence, or predetermined protocol, communicated to them by the card controller 608.

The card controller 608 is configured to communicate with both ends of the optical fibre span 606 and therefore with each of the master and slave optical nodes 602, 604. The card controller 608 initiates the measurement sequence and provides to the master and slave optical nodes 602, 604 both an initiate command and as data relating to the predetermined protocol. The data relating to the predetermined protocol comprises data on setting the laser wavelength, power and modulation frequencies as well as the defined communication sequences.

The master optical node 602 comprises two laser sources 1002 in an optical source assembly. The laser sources are configured for measurement purposes, although they may comprise optical pump light sources as described above. Therefore, the master optical node 602 may be part of an existing optical card in the node 602, such as an amplifier, but could be part of a separate specific card.

The slave optical node 604 comprises a pair of receivers 1004, which are configured for measurement purposes. The laser wavelengths of each of the laser sources 1002 are chosen as part of the predetermined protocol and allow detectable transmission of the laser sources from one end of the optical fibre span 606 to the receivers 1004. The wavelengths are also chosen for accurate measurement of CD within the optical fibre 606 and are chosen for the particular application, fibre type etc. or are those already used for amplification purposes.

One of several methods for measurement of CD can be chosen. These include the methods described above. Two tuneable lasers can be used to determine the CD using the differential phase shift method. For example, CD may be determined using two c-band lasers with fixed wavelength separation. Alternatively a fixed wavelength laser may be used in conjunction with a tuneable laser to determine the CD using the phase shift method. It is noted that other methods may be used with the exemplary methods and apparatuses disclosed herein.

In both the differential phase shift method and the phase shift method, a modulation signal is applied to light emitted by the laser sources 1002 at the master optical node 602. The receivers 1004 collect the modulated light that has been propagated through the optical fibre 606. The data in the received light is then used to calculate the CD of the optical fibre. This calculation may be undertaken at the master or slave optical nodes 602, 604. In either case, data must be sent back to the master optical node 602. The data sent back to the master optical node 602 may comprise raw received data, a calculated phase of received light from each laser, or the calculated CD.

A communications laser 1006 is placed in the slave optical node 604 to send data upstream to the master optical node 602. The optical powers of the lasers 1002, 1006 are set by the transmission span losses and distance to ensure detectable signal reaches the receiver.

Figure 11:
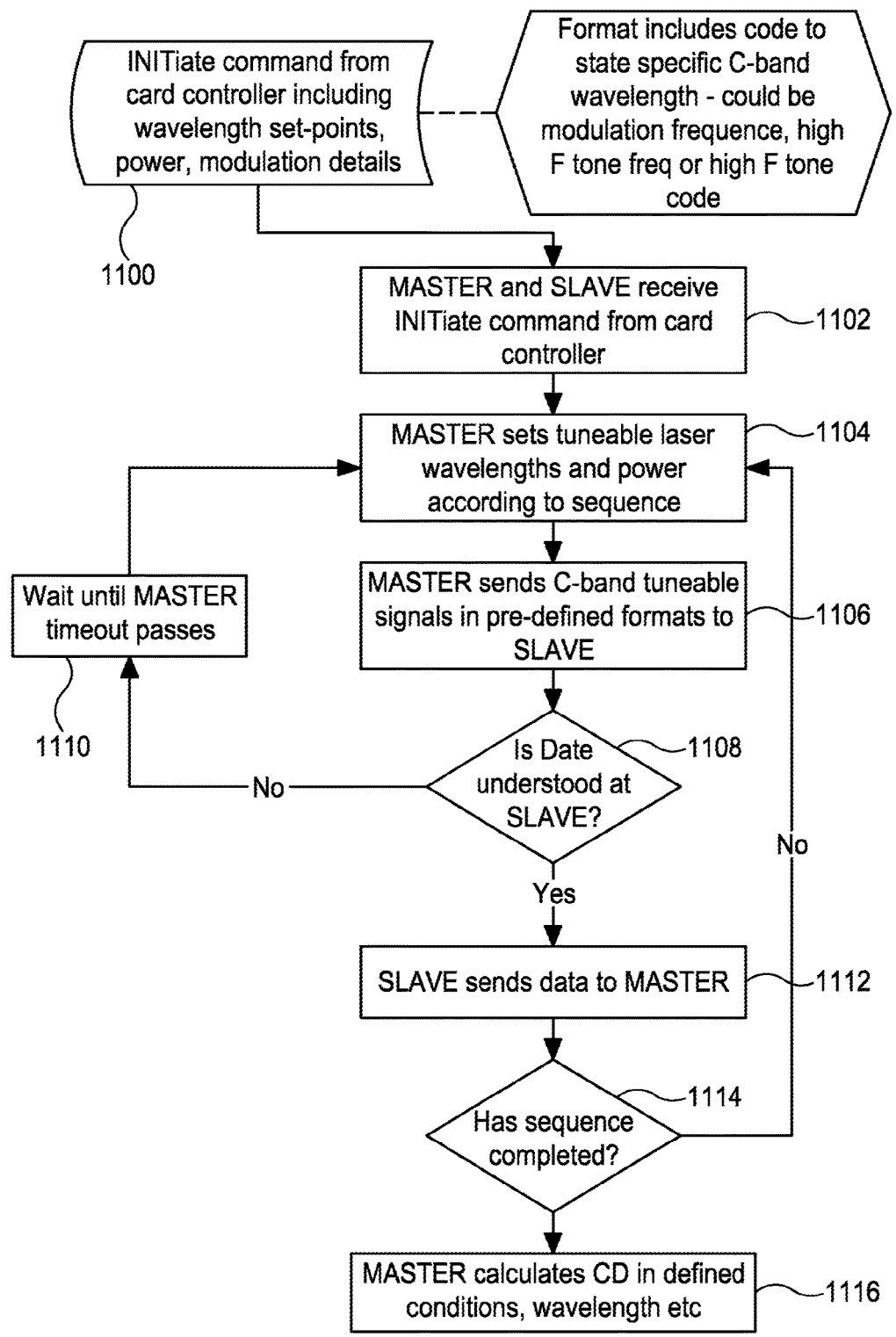
FIG. 11 is a method for determining parameters of an optical fibre.

FIG. 11 shows an exemplary method for determining the CD of the optical fibre 606.

An initiate and control command is transmitted 1100 from the card controller 608 to the master and slave optical nodes 602, 604. The command comprises data relating to the laser wavelengths, power, modulation details and the predetermined protocol.

The initiate and control command is received 1102 by the master and slave optical nodes 602, 604 and the master optical node 602 sets 1104 the power of the laser sources 1002 and the modulation format and frequency, which are calculated for the span and measurement to be taken. In the exemplary method of FIG. 11, the master optical node 602 also sets the wavelength(s) of the tunable laser source(s) as necessary.

The master optical node 602 sends 1106 C-band tunable laser light signals in the predefined format to the slave optical node 604.

The slave optical node 604 receives the light, extracts data from it and determines 1108 whether the data comprises errors and, if so, waits 1110 for the master optical node 604 timeout to pass, after which the master optical node 604 will begin the process again. If the data is error free, the slave optical node 604 transmits 1112 the data to the master optical node 604. The data transmitted to the master optical node 602 may be data relating to the phase difference between the received light signals. As such, the data transmitted to the master optical node 602 is considered to comprise raw signal data as it does not comprise data relating to a determined CD of the optical fibre 606.

The master optical node 604 determines 1114 whether the sequence is complete. If the sequence is not complete, the process is begun again. If the sequence is complete, the master optical node 604 calculates 1116 the CD of the optical fibre 606.

Figure 12:
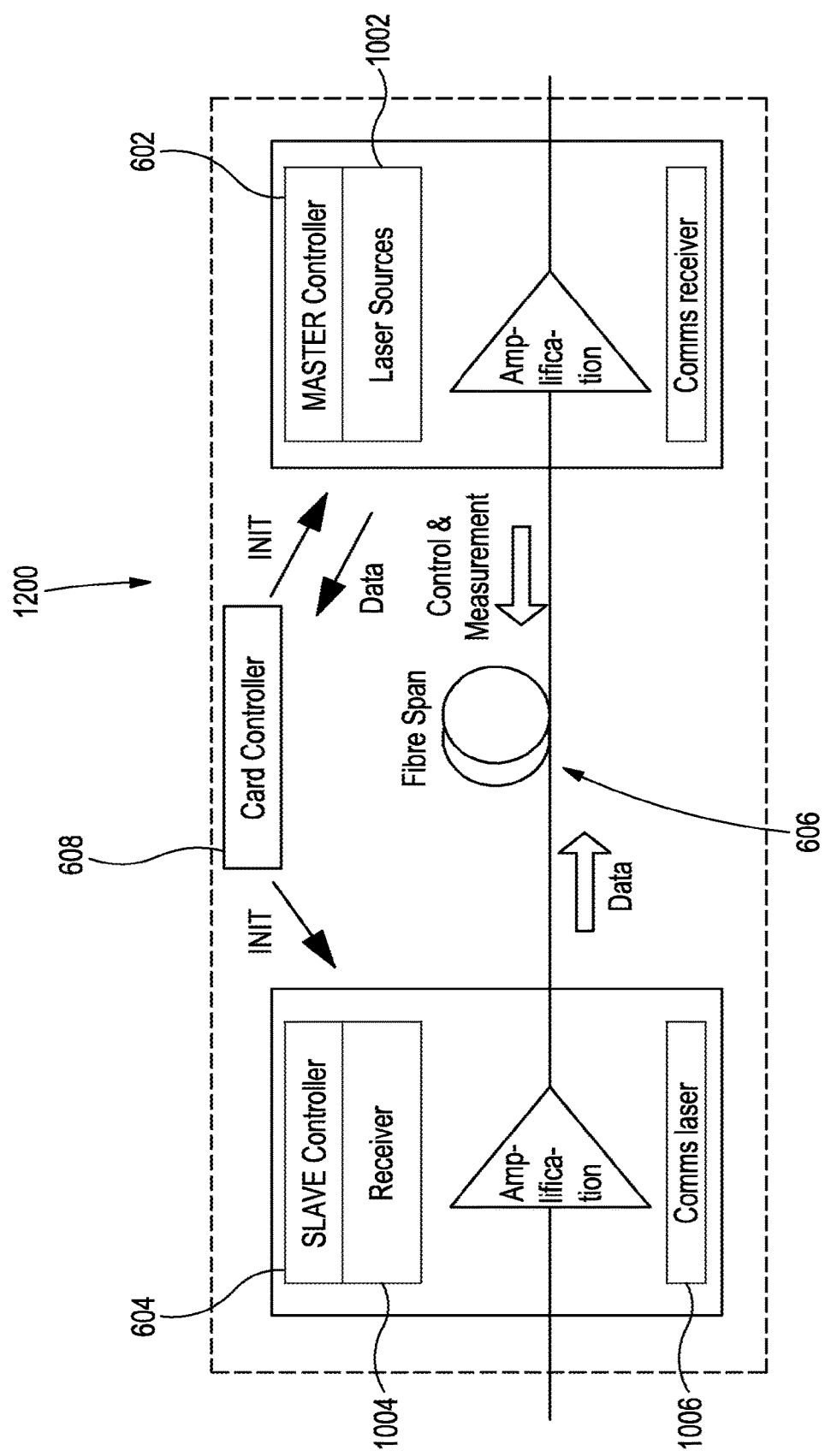
FIG. 12 is a schematic block diagram showing a master node and a slave node connected via an optical fibre.

A further exemplary method and apparatus for CD determination is when the master optical node 604 is the controller in the system. Referring to FIG. 12, an optical amplifier assembly 1200 is shown. The topology of the assembly 1200 may be the same as that of assemblies 600, 800, 1000 shown in FIGS. 6, 8 and 10. Corresponding features of the assembly 1200 to the assemblies 600, 800 and 1000 have the same reference numeral. The optical amplifier assembly 1200 may be configured to determine the CD of the optical fibre 606. The assembly 1200 is configured such that an initiate command is still transmitted by the Card controller, but the master optical node 604 determines the predetermined protocol details, such as laser wavelengths, optical powers, modulation format and frequency etc. calculated for the specific span and measurement to be undertaken. In the assembly 1200, the master optical node 604 is also configured to communicate this information to the slave optical node 602 using the laser sources.

Figure 13:
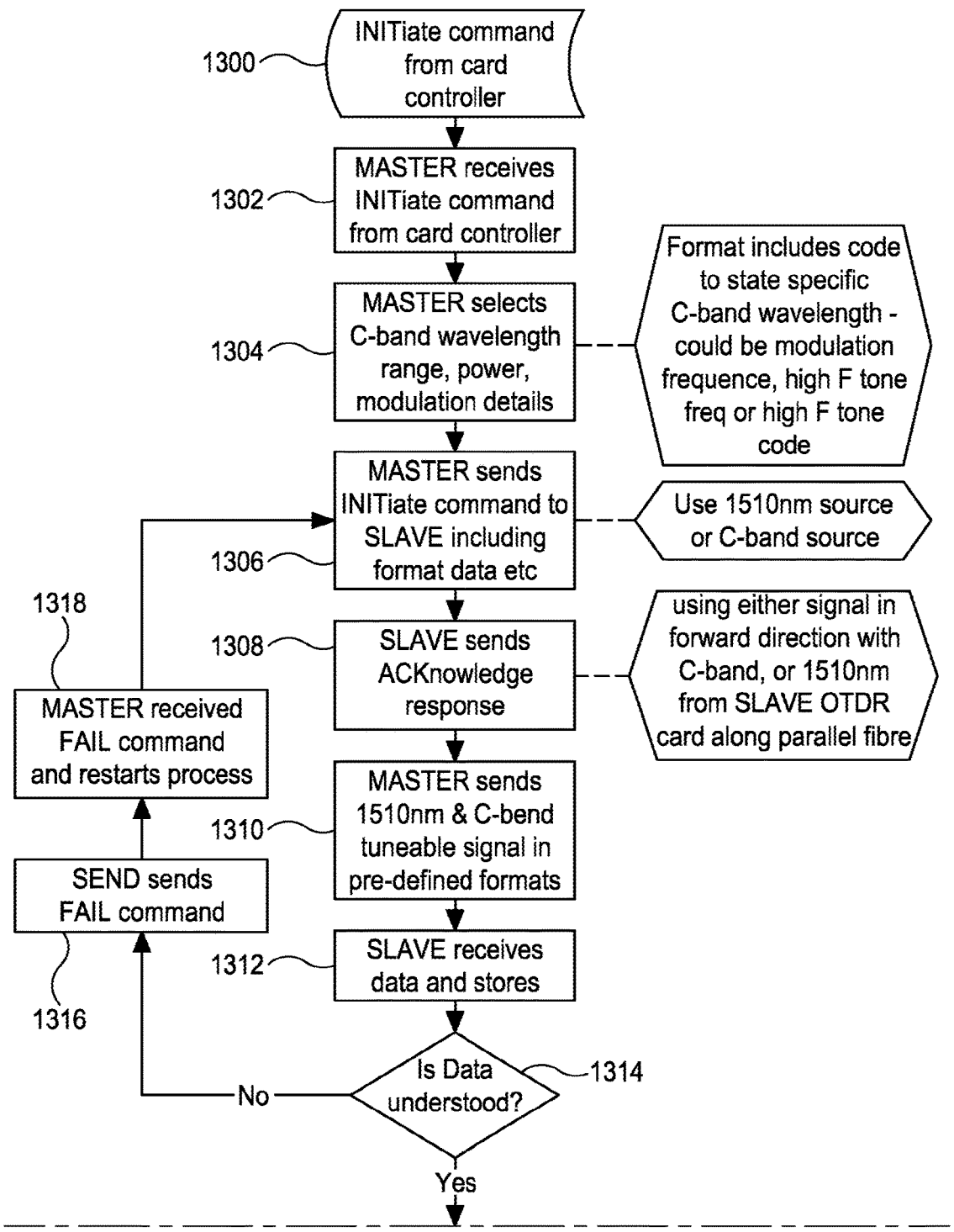
FIG. 13 is a method for determining parameters of an optical fibre.
Figure 13:
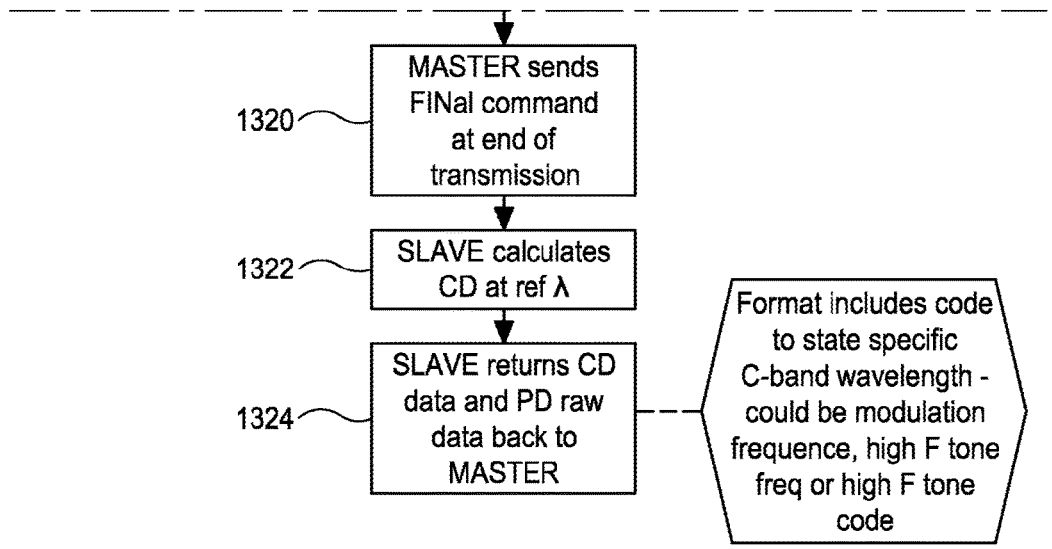

Referring to FIG. 13, a method is shown for determining the CD of the optical fibre using the optical amplifier assembly of FIG. 12.

An initiate command is transmitted 1300 by the card controller 608 and is received 1302 by the master optical node 602, which then selects 1304 the C-band wavelength range, power and modulation details.

The master optical node 602 transmits 1306 an initiate and control command to the slave optical node 604 to inform the slave optical node 604 that a CD determination is about to take place and to provide the predetermined protocol for the exchange of data. The slave optical node 604 responds by transmitting 1308 an acknowledge signal.

The master optical node 602 sends first and second laser light signals 1310 modulated according to the predetermined protocol, which are received 1312 by the slave optical node 604 when using the phase or differential phase shift method.

The slave optical node 604 extracts data from the light signals and determines 1314 whether the data is free from errors. If the data comprises errors, the slave optical node 604 sends 1316 a fail message, which is received 1318 by the master optical node 602 and the process is restarted.

At the end of the transmission, the master optical node 602 sends 1320 a final command to inform the slave optical node 604 that the transmission is over.

The slave optical node 604 calculates the CD of the optical fibre 606 at the reference wavelength and returns 1324 CD data and phase difference raw data to the master optical node 602. The data transmitted to the master optical node 602 therefore comprises data corresponding to the determined parameter, as it comprises the CD of the optical fibre 606.

In each of the optical assemblies 600, 800, 1000, 1200 and corresponding methods described above, the apparatus topologies are largely the same. Therefore, the same assembly topology may be used to undertake one or more of the methods described.

It is noted that the methods described in FIGS. 7, 9, 11 and 13 may be used in conjunction with the methods and apparatuses described in FIGS. 1 to 3.

The skilled person will be able to envisage other embodiments without departing from the scope of the appended claims.

The invention claimed is:

1. A master node for use in an optical system for determining a parameter of one or more optical fibres for use in an optical amplifier assembly, the master node configured to be in optical communication with a slave node via the one or more optical fibres and configured to transmit and receive optical signals according to a predetermined protocol,
wherein the master node is configured to transmit a first optical signal intended for the slave node and to receive a second optical signal comprising raw signal data transmitted by the slave node,
and wherein the master node is further configured to determine whether the raw signal data is free from errors, and responsive to the raw signal data being error free raw signal data, to determine the parameter based on the error free raw signal data and to transmit a further optical signal to the slave node to indicate that the parameter determination is complete.

2. A method for operating a master node for use in an optical system for determining a parameter of one or more optical fibres for use in an optical amplifier assembly, the master node configured to be in optical communication with a slave node via the one or more optical fibres and configured to transmit and receive optical signals according to a predetermined protocol, the method comprising:
> transmitting a first optical signal intended for the slave node;
> receiving a second optical signal comprising raw signal data transmitted by the slave node;
> determining whether the raw signal data is free from errors, and responsive to the raw signal data being error free raw signal data, determining the parameter based on the error free raw signal data and transmitting a further optical signal to the slave node to indicate that the parameter determination is complete.

3. A non-transitory computer readable medium comprising computer readable code configured, when read by a computer, to carry out the method according to claim 2.

4. A slave node for use in an optical system for determining a parameter of one or more optical fibres for use in an optical amplifier assembly, the slave node configured to be in optical communication with a master node via the one or more optical fibres and configured to transmit and receive optical signals according to a predetermined protocol,
> wherein the slave node is configured to receive a first optical signal transmitted by a master node and, dependent on the predetermined protocol, take one or more of the following steps:
>> determine the parameter based on the received first optical signal and transmit a second optical signal comprising data corresponding to the determined parameter to the master node; and
>> transmit a second optical signal comprising raw signal information to the master node.

5. A method for operating a slave node for use in an optical system for determining a parameter of one or more optical fibres for use in an optical amplifier assembly, the slave node configured to be in optical communication with a master node via the one or more optical fibres and configured to transmit and receive optical signals according to a predetermined protocol, the method comprising:
> receiving a first optical signal transmitted by a master node and, dependent on the predetermined protocol, taking one or more of the following steps:
>> determining the parameter based on the received first optical signal and transmitting a second optical signal comprising data corresponding to the determined parameter to the master node; and
>> transmitting a second optical signal comprising raw signal information to the master node.

6. A non-transitory computer readable medium comprising computer readable code configured, when read by a computer, to carry out the method according to claim 5.

7. The method according to claim 1, wherein the parameter is selected from the group consisting of chromatic dispersion and fibre length.

8. The method according to claim 2, further comprising using the determined parameter to control operating characteristics of the optical amplifier assembly.

9. A method for operating a master node and a slave node for use in an optical system for determining a parameter of one or more optical fibres for use in an optical amplifier assembly, the master node and slave node configured to be in optical communication with one another via the one or more optical fibres and configured to transmit and receive optical signals according to a predetermined protocol, the method comprising:
> transmitting a first optical signal from the master node to the slave node;
> receiving the first optical signal at the slave node;
> transmitting from the slave node a second optical signal comprising raw signal data to the master node;
> receiving the second optical signal at the master node;
> determining, at the master node, whether the raw signal data is free from errors, and responsive to the raw signal data being error free raw signal data, determining the parameter based on the error free raw signal data; and
> transmitting a further optical signal from the master node to the slave node to indicate that the parameter determination is complete.

10. A method for operating a master node and a slave node for use in an optical system for determining a parameter of one or more optical fibres for use in an optical amplifier assembly, the master node and slave node configured to be in optical communication with one another via the one or more optical fibres and configured to transmit and receive optical signals according to a predetermined protocol, the method comprising:
> transmitting a first optical signal from the master node to the slave node;
> receiving the first optical signal at the slave node;
> determining, at the slave node, the parameter based on the received first optical signal;
> transmitting from the slave node a second optical signal comprising data corresponding to the determined parameter to the master node;
> receiving the second optical signal at the master node; and
> transmitting a further optical signal from the master node to the slave node to indicate that the parameter determination is complete.

* * * * *